G. A. EDWARDS & G. SCHIEDER.

Shuttles for Sewing-Machines.

No. 5,342.

Reissued April 1, 1873.

Witnesses.

A. G. Lengel

J. A. Rood

Inventors.

George Ansel Edwards

George Schieder

AM. PHOTO-LITHOGRAPHIC CO. N.Y. (OSBORNE'S PROCESS.)

UNITED STATES PATENT OFFICE.

GEORGE A. EDWARDS AND GEORGE SCHIEDER, OF SYRACUSE, NEW YORK.

IMPROVEMENT IN SHUTTLES FOR SEWING-MACHINES.

Specification forming part of Letters Patent No. 136,311, dated February 25, 1873; reissue No. 5,342, dated April 1, 1873; application filed March 26, 1873.

*To all whom it may concern:*

Be it known that we, GEORGE ANSEL EDWARDS and GEORGE SCHIEDER, of Syracuse, county of Onondaga and State of New York, have invented certain Improvements in Shuttles for Sewing-Machines, of which the following is a specification:

Our invention relates to shuttles for sewing-machines; and consists in means, hereinafter described, for governing the tension of the shuttle-thread through the agency of devices acting on the bobbin.

Figure 1:
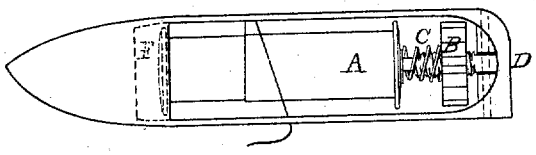
Figure 2:
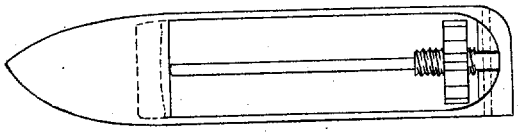
Figure 4:
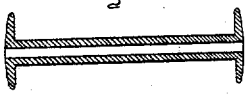
Figure 5:
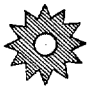
Figure 3:
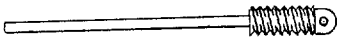
Figure 6:
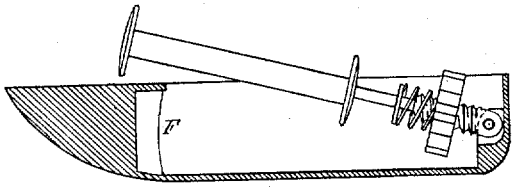

Figure 1 is a view of the shuttle with the bobbin in position; Fig. 2, a horizontal section of the shuttle with the spindle turned out for removing or placing in position the spool or bobbin; and Fig. 3 is a view of the spindle.

A is the shuttle, of the form commonly employed in most first-class machines, and *a* is a countersunk depression adapted to receive the end of the bobbin. B is the spindle, hinged or pivoted at the heel of the shuttle, and provided with the screw-thread C, which receives the nut D. E represents a spiral spring, placed on the hinged spindle between its free end and the nut D. Preferably, a washer of leather or other suitable material is placed in the depression *a*, so that the head of the bobbin may rest against it, and a second similar washer is placed about the spindle at the end of the coiled spring, and so as to bear against the bobbin. F is the bobbin, formed as an ordinary spool, and provided with a tubular barrel to receive the hinged spindle. In Fig. 1 this bobbin is shown as wound with thread, but in Fig. 2 it is shown without thread. The center of depression *a* and the spindle, when in working position, should be in the same horizontal line.

The spindle may be turned outward from the position shown in Fig. 1 to that shown in Fig. 2, so as to remove a bobbin, by moving the bobbin or the spindle against the action of the spring C sufficiently far to withdraw its head from the depression. When placing a bobbin in the shuttle it must be forced on the spindle against the spring sufficiently far to allow its head to pass with the spindle within the shuttle, and when in the position shown in Fig. 1 the spring presses the bobbin forward so that its head passes into the depression *a*. By turning the nut D on the threaded portion of the spindle the pressure of the spring or washer against the bobbin may be increased or diminished, and in this way the tension of the shuttle-thread may be proportionately increased or diminished.

*Claim.*

The shuttle provided with the pivoted screw-threaded spindle, thumb-nut, and spring, and with the depression *a*, into which the head of the bobbin may be pressed by the spring and nut, as described.

GEORGE ANSEL EDWARDS.
GEORGE SCHIEDER.

Witnesses:
A. F. LEWIS,
A. R. BALDWIN.